(12) United States Patent
Kim

(10) Patent No.: US 7,292,380 B2
(45) Date of Patent: Nov. 6, 2007

(54) COMPACT ZOOM LENS

(75) Inventor: Dong-woo Kim, Changwon-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 10 days.

(21) Appl. No.: 11/443,648

(22) Filed: May 30, 2006

(65) Prior Publication Data

US 2007/0139787 A1 Jun. 21, 2007

(30) Foreign Application Priority Data

Dec. 15, 2005 (KR) ........................ 10-2005-0124114

(51) Int. Cl.
*G02B 15/14* (2006.01)
(52) U.S. Cl. ..................... 359/2; 359/680; 359/689
(58) Field of Classification Search ................ 359/680, 359/682, 683, 685, 689
See application file for complete search history.

(56) References Cited

U.S. PATENT DOCUMENTS

| 6,804,064 B2 | 10/2004 | Hirakawa | |
|---|---|---|---|
| 7,079,326 B2 * | 7/2006 | Hirakawa | 359/682 |
| 7,092,170 B2 * | 8/2006 | Satori | 359/689 |
| 7,180,679 B2 * | 2/2007 | Nose et al. | 359/682 |

FOREIGN PATENT DOCUMENTS

| JP | 2000-267009 A | 9/2000 |
|---|---|---|
| JP | 2002-372667 A | 12/2002 |
| JP | 2003-050352 A | 2/2003 |
| JP | 2005-258067 A | 9/2005 |

* cited by examiner

*Primary Examiner*—David N. Spector
(74) *Attorney, Agent, or Firm*—Drinker Biddle & Reath LLP

(57) ABSTRACT

A compact zoom lens that include: a first lens group having a negative refractive power; a second lens group having a positive refractive power; and a third lens group having a positive refractive power, wherein the first through third lens groups are arranged sequentially from an object when zooming is performed from a wide angle position to a telephoto position, a distance between the first lens group and the second lens group decreases and a distance between the second lens group and the third lens group increases, and the zoom lens includes at least one plastic lens and satisfies the inequality $$1 \leq \frac{(G1 + G2 + G3)}{f_w} \leq 1.8$$

where G1 denotes a thickness of the first lens group, G2 denotes a thickness of the second lens group, G2 denotes a thickness of the third lens group, and fw denotes an overall focal length at the wide angle position. Accordingly, the zoom lens can ensure a high zoom ratio, and be made compact and light at low manufacturing costs.

20 Claims, 20 Drawing Sheets

LONGITUDINAL SPHERICAL ABERRATION

------- 656.2700 NM
——— 587.5000 NM
- - - - 486.1300 NM

FOCUS (MILLIMETERS)

ASTIGMATIC FIELD CURVATURE

FOCUS (MILLIMETERS)

I (WIDE ANGLE END)

I (MEDIUM ANGLE END)

I (TELEPHOTO END)

LONGITUDINAL SPHERICAL ABERRATION

ASTIGMATIC FIELD CURVATURE

ASTIGMATIC CURVATURE

DISTORTION

ASTIGMATIC FIELD CURVATURE

FOCUS (MILLIMETERS)

DISTORTION

DISTORTION

LONGITUDINAL SPHERICAL ABERRATION

- — - — 656.2700 NM
- ——— 587.5000 NM
- - - - - 486.1300 NM

FOCUS (MILLIMETERS)

ASTIGMATIC FIELD CURVATURE

FOCUS (MILLIMETERS)

LONGITUDINAL SPHERICAL ABERRATION

FOCUS (MILLIMETERS)

ASTIGMATIC FIELD CURVATURE

FOCUS (MILLIMETERS)

COMPACT ZOOM LENS

CROSS-REFERENCE TO RELATED PATENT APPLICATION

This application claims the benefit of Korean Patent Application No. 10-2005-0124114, filed on Dec. 15, 2005, in the Korean Intellectual Property Office, the disclosure of which is incorporated herein in its entirety by reference.

BACKGROUND OF THE INVENTION

1. Field of the Invention

The present invention relates to a zoom lens that can be used for an imaging optical system using a solid state imaging device and can be made compact and light at low cost.

2. Description of the Related Art

In general, zoom lenses used in still cameras or video cameras should have excellent optical performance, a high zoom ratio, and a compact design. Moreover, with the widespread use of electronic equipment such as portable information terminals, e.g., personal digital assistants (PDAs) or mobile terminals, digital cameras or digital video units are increasingly installed in such electronic equipment. As a result, cameras should be more compact. Solid state imaging devices, such as charge coupled devices (CCD) or complimentary metal-oxide semiconductors (CMOSs), used for electronic still cameras or video cameras, should also be compact, light, and inexpensive.

FIG. 1 is a cross-sectional view illustrating an optical configuration of a conventional zoom lens disclosed in U.S. Pat. No. 6,804,064 B2. Referring to FIG. 1, the conventional zoom lens includes a first lens group L1 having a first lens 1, a second lens 2, and a third lens 3; a second lens group L2 having a fourth lens 4, a fifth lens 5, a sixth lens 6; and a seventh lens 7; and a third lens group L3 having an eighth lens 8. The second lens group L2 consists of the fourth lens 4 having a positive refractive power, the sixth lens 6 having a positive refractive power and a meniscus shape convex toward an object, and the seventh lens 7 that has a positive refractive power, which are arranged sequentially from the object.

The first through third lens groups L1 through L3 of the conventional zoom lens are moved during zooming. When zooming is performed from a wide angle position to a telephoto position, the second lens group L2 is moved a great distance, thereby increasing the size of the zoom lens optical system and requiring a large receiving space. Also, since the doublet of the second lens group L2, which is used for chromatic aberration correction, is too thick, the size of the zoom lens optical system is increased even further.

Japanese Patent Laid-Open Publication No. 2003-050352 discloses a zoom lens in which a first object-side lens of a second lens group is a plastic aspheric lens. In this case, it is difficult to correct spherical aberration during zooming of the optical system and achieve a zoom ratio of 2× or more.

SUMMARY OF THE INVENTION

The present invention provides a zoom lens that can ensure a high zoom ratio, can be made compact and light, and have reduced manufacturing costs.

According to an aspect of the present invention, there is provided a zoom lens comprising: a first lens group having a negative refractive power; a second lens group having a positive refractive power; and a third lens group having a positive refractive power, wherein the first through third lens groups are arranged sequentially from an object when zooming is performed from a wide angle position to a telephoto position, a distance between the first lens group and the second lens group decreases and a distance between the second lens group and the third lens group increases, and the zoom lens includes at least one plastic lens and satisfies the inequality $$1 \le \frac{(G1 + G2 + G3)}{f_w} \le 1.8$$

where G1 denotes a thickness of the first lens group, G2 denotes a thickness of the second lens group, G3 denotes a thickness of the third lens group, and $f_w$ denotes an overall focal length at the wide angle position.

According to another aspect of the present invention, there is provided a zoom lens comprising: a first lens group having a negative refractive power; a second lens group having a positive refractive power; and a third lens group having a positive refractive power, wherein the first through third lens groups are arranged sequentially from an object, zooming is performed from a wide angle position to a telephoto position so that the distance between the first lens group and the second lens group decreases, and the distance between the second lens group and the third lens group increases, and the zoom lens includes at least one plastic lens and satisfies the inequality $$1 \le \frac{(G1 + G2 + G3)}{f_w} \le 1.9$$

$$2.5 \le \frac{f_t}{f_w} \le 3.2$$

where G1 denotes a thickness of the first lens group, G2 denotes a thickness of the second lens group, G3 denotes a thickness of the third lens group, $f_w$ denotes an overall focal length at the wide angle position, and $f_t$ denotes an overall focal length at the telephoto position.

The zoom lens may satisfy the inequality $$2.1 \le \frac{G1 + (D1_w - D1_t)}{f_w} \le 3.2$$

where G1 denotes a thickness of the first lens group, $D1_w$ denotes a distance between the first lens group and the second lens group at the wide angle position, $D1_t$ denotes a distance between the first lens group and the second lens group at the telephoto position, and $f_w$ denotes an overall focal length at the wide angle position.

A second object-side lens of the first lens group may be a plastic aspheric lens.

The first lens group may have a plastic aspheric lens with a negative refractive power, and the second lens group may have a plastic aspheric lens with a positive refractive power.

A last object-side lens of the second lens group may be a plastic aspheric lens.

The third lens group may have a lens with a positive refractive power, a high refractive index, and a high Abbe number.

The first lens group may have only a plurality of meniscus lenses.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
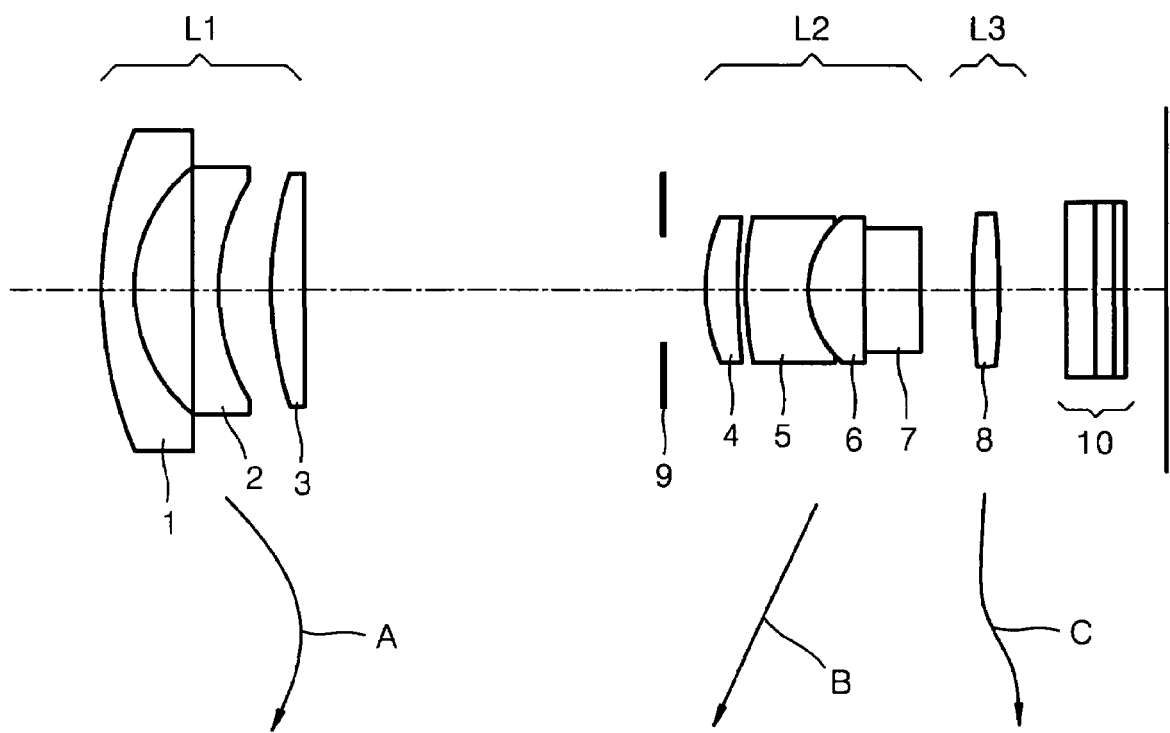
FIG. 1 is a cross-sectional view illustrating an optical configuration of a conventional zoom lens disclosed in U.S. Pat. No. 6,804,064 B2.
Figure 2:
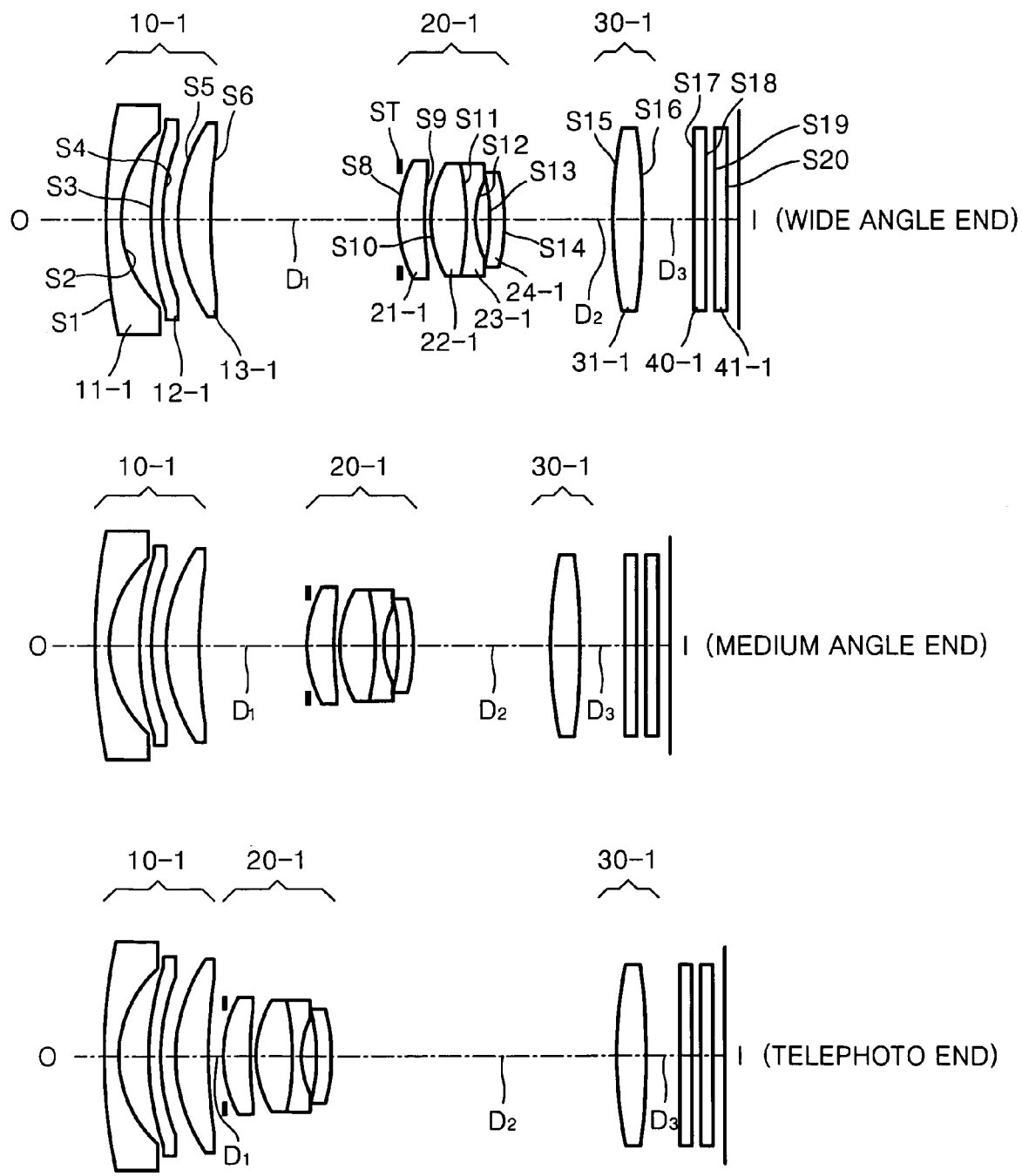
FIG. 2 is cross-sectional views illustrating optical configurations of a compact zoom lens at a wide angle position, a medium angle position, and a telephoto position, respectively, according to an embodiment of the present invention.

FIG. 2 is cross-sectional views illustrating optical configurations of a compact zoom lens according to an embodiment of the present invention. Referring to FIG. 2, the compact zoom lens includes a first lens group 10-1 with a negative refractive power, a second lens group 20-1 with a positive refractive power, and a third lens group 30-1 with a positive refractive power, which are arranged sequentially from an object O. Zooming is performed from a wide angle position to a telephoto position so that a distance between the first lens group 10-1 and the second lens group 20-1 decreases and a distance between the second lens group 20-1 and the third lens group 30-1 increases. The zoom lens includes at least one plastic lens to correct aberration. Thus, manufacturing costs are effectively reduced. Since a focal length of the plastic lens is much greater than an overall focal length, a moving amount of an image plane according to temperature change can be minimized.

The first lens group 10-1 has at least one plastic lens. A second object-side lens of the first lens group 10-1 may be a plastic aspheric lens. Also, the first lens group 10-1 has a plastic aspheric lens with a negative refractive power, and the second lens group 20-1 has a plastic aspheric lens with a positive refractive power. When a last object-side lens of the second lens group 20-1 is a plastic aspheric lens, spherical aberration occurring in a first lens of the second lens group 20-1 can be dispersed with the plastic lens of the second lens group 20-1, to reduce the sensitivity of the second lens group 20-1 to external environment.

Meanwhile, the zoom lens satisfies the inequality $$1 \leq \frac{(G1 + G2 + G3)}{f_w} \leq 1.9 \qquad (1)$$

where G1 denotes a thickness of the first lens group 10-1, G2 denotes a thickness of the second lens group 20-1, G3 denotes a thickness of the third lens group 30-1, and $f_w$ denotes an overall focal length at the wide angle position.

When the ratio of the sum of the thicknesses of the lens groups 10-1, 20-1, and 30-1 to the overall focal length is too great to exceed the upper limit of Formula 1, it is difficult to make the zoom lens compact. When the ratio is too low to be below the lower limit of Formula 1, it is difficult to correct aberration at the telephoto position and costs for processing the thin lens groups 10-1, 20-1, and 30-1 increase.

Preferably, the zoom lens may satisfy the inequality $$1 \leq \frac{(G1 + G2 + G3)}{f_w} \leq 1.8 \qquad (2)$$

where G1 denotes a thickness of the first lens group 10-1, G2 denotes a thickness of the second lens group 20-1, G3 denotes a thickness of the third lens group 30-1, and $f_w$ denotes an overall focal length at the wide angle position.

The zoom lens satisfying Formula 2 can be made more compact and provide high magnification.

Also, a zoom ratio of the zoom lens satisfies the inequality $$2.5 \leq \frac{f_t}{f_w} \leq 3.2 \qquad (3)$$

where $f_t$ denotes an overall focal length at the telephoto position and $f_w$ denotes an overall focal length at the wide angle position. When the zoom ratio exceeds the upper limit of Formula 3, it is difficult to correct spherical aberration at the telephoto position, and the second lens groups 20-1 moves a great distance during zooming from the wide angle position to the telephoto position. Thus, it is difficult to make the zoom lens compact. When the zoom ratio is below the lower limit of Formula 3, the zoom ratio is too low relative to the ratio of the sum of the thicknesses of the lens groups 10-1, 20-1, and 30-1 to the overall length of the optical system.

Also, the ratio of a distance change between the first and second lens groups 10-1 and 20-1 of the zoom lens during zooming from the wide angle position to the telephoto position to a focal length at the wide angle position satisfies the inequation $$2.1 \leq \frac{G1 + (D1_w - D1_t)}{f_w} \leq 3.2 \quad (4)$$

where G1 denotes a thickness of the first lens group 10-1, $D1_w$ denotes a distance between the first lens group 10-1 and the second lens group 20-1 at the wide angle position, $D1_t$ denotes a distance between the first lens group 10-1 and the second lens group 20-1 at the telephoto position, and $f_w$ denotes an overall focal length at the wide angle position. When the ratio of the distance change between the first lens group 10-1 and the second lens group 20-1 during zooming from the wide angle position to the telephoto position to the overall focal length at the wide angle position is too great to exceed the upper limit of Formula 4, the entire size of the optical system increases and it is difficult to make the zoom lens compact. When the ratio is too low to be below the lower limit of Formula 4, it is difficult to ensure a high zoom ratio of 3× or more, and the thickness of the first lens group 10-1 is reduced, thereby reducing performance deterioration due to temperature change.

In detail, the first lens group 10-1 has only a plurality of meniscus lenses to achieve a thin optical configuration. The first lens group 10-1 has first and second convex meniscus lenses 11-1 and 12-1, each of which has a negative refractive power, and a third meniscus lens 13-1 with a positive refractive power, which are arranged sequentially from the object O. The second meniscus lens 12-1 is a plastic aspheric lens to effectively correct distortion. In this case, a thinner optical system can be obtained by reducing a difference between thicknesses of a central portion and a peripheral portion of the plastic lens 12-1, thereby operating stably at any temperature change.

The second lens group 20-1 has a fourth meniscus lens 21-1 with a positive refractive power and a convex surface toward an object side; a fifth lens 22-1 with a positive refractive power; a sixth lens 23-1 with a negative refractive power; and a seventh meniscus lens 24-1 with a positive refractive power and a convex surface toward an image side. The fifth lens 22-1 and the sixth lens 23-1 are formed into a doublet, and the seventh meniscus lens 24-1 is a plastic lens. Hereinafter, a lens with a positive refractive power and a lens with a negative refractive power are referred to as a positive lens and a negative lens, respectively.

An aperture stop ST is disposed between the first lens group 10-1 and the second lens group 20-1, and the fourth lens 21-1 of the second lens group 20-1 closest to the aperture stop ST is a spherical lens to reduce manufacturing costs, compared with the case when the fourth lens 21-1 is an aspheric lens. The fifth lens 22-1 has a relatively low dispersion value and the sixth lens 23-1 has a relatively high dispersion value to minimize chromatic aberration occurring during zooming at high magnification. The seventh meniscus lens 24-1 is a plastic aspheric lens to minimize spherical aberration. In particular, the plastic lens 12-1 of the first lens group 10-1 is a negative lens, and the plastic lens 24-1 of the second lens group 20-1 is a positive lens. Since the negative lens 12-1 and the positive lens 24-1 have similar focal lengths, which are longer than those of other lenses, a movement of an image plane due to temperature change can be compensated effectively. That is, since the first lens group 10-1 has the negative plastic aspheric lens 12-1 and the second lens group 20-1 has the positive plastic aspheric lens 24-1, the effective power distribution by the plastic aspheric lenses 12-1 and 24-1 can minimize a moving amount of the image plane due to temperature change.

The third lens group 30-1 has a positive lens 31-1 with a high refractive index and a high Abbe number to prevent an angle of light incident on the image surface at the wide angle position from increasing and to minimize chromatic aberration of magnification occurring during correction of the image plane movement due to a movement of the object O.

The zoom lens optical system constructed as above can be made compactly and inexpensively.

Meanwhile, the term "aspheric" used herein is defined as follows. The aspheric shapes of the zoom lens satisfy the following Formula 5 when an optical axis is the X-axis, a direction perpendicular to the optical axis is the Y-axis, and a progressing direction of light is defined in a positive direction.

$$x = \frac{cy^2}{1 + \sqrt{1 - (K+1)c^2 y^2}} + Ay^4 + By^6 + Cy^8 + Dy^{10} \quad (5)$$

where x denotes a depth from a vertex of a lens to a plane of the lens in the optical axis; y denotes a height in the direction perpendicular to the optical axis; K denotes a conic constant; A, B, C, and D denote aspheric coefficients; and c denotes a reciprocal 1/R of a radius of curvature R at the vertex of the lens.

In various embodiments of the present invention, a zoom lens includes lenses satisfying optimization conditions for miniaturization of the zoom lens.

Detailed lens data used for a zoom lens in various embodiments of the present invention will now be described.

EMBODIMENT 1

Hereinafter, f denotes a combined focal length of an entire lens system; Fno denotes an F-number; ω denotes a field angle; R denotes a radius of curvature; Dn denotes a thickness of a center of a lens or a distance between lenses; $N_d$ denotes a refractive index; $V_d$ denotes an Abbe number; St denotes an aperture stop; and D1, D2, and D3 denote variable distances between lenses. Reference numerals of elements in the embodiments are written with embodiment numbers.

FIG. 2 is a cross-sectional view of a zoom lens according to an embodiment of the present invention. Referring to FIG. 2, a first lens group 10-1 has a first lens 11-1, a second lens 12-1, and a third lens 13-1. A second lens group 20-1 has fourth through seventh lenses 21-1, 22-1, 23-1, and 24-1. A third lens group 30-1 has an eighth lens 31-1. Reference numeral 40-1 designates an infrared filter, and reference numeral 41-1 designates a cover glass.

f; 6.19~10.16~17.34, Fno; 2.86~3.66~5.162, ω; 63.48~39.44~23.38

| Surface(S) | Radius of curvature(R) | Thickness or distance Between lenses(Dn) | Refractive index($N_d$) | Abbe number($V_d$) |
|---|---|---|---|---|
| 0: | INFINITY | INFINITY | | |
| S1: | 24.223 | 0.70 | 1.834813 | 43.8483 |
| S2: | 5.698 | 1.40 | | |
| S3: | 15.318 | 0.60 | 1.531200 | 56.5000(plastic lens) |
| S4: | 9.935 | 0.74 | | |
| | ASP: | | | |
| | K: −7.524912 | | | |
| | A: 0.715240E−03 | B: −.431749E−04 | C: 0.528460E−05 | D: −.376759E−07 |
| S5: | 9.098 | 1.41 | 1.846707 | 23.7973 |
| S6: | 19.173 | D1 | | |
| ST: | INFINITY | 0.00 | | |
| S8: | 7.416 | 1.19 | 1.834916 | 43.8409 |
| S9: | 30.255 | 0.20 | | |
| S10: | 5.472 | 1.66 | 1.729017 | 54.6784 |
| S11: | −16.578 | 0.50 | 1.728452 | 29.1216 |
| S12: | 4.002 | 0.68 | | |
| S13: | −12.861 | 0.68 | 1.531200 | 56.5000(plastic lens) |
| | ASP: | | | |
| | K: 0.000000 | | | |
| | A: −.131300E−02 | B: −.466700E−03 | C: 0.168300E−03 | D: −.181359E−04 |
| S14: | −9.192 | D2 | | |
| | ASP: | | | |
| | K: 0.000000 | | | |
| | A: 0.549500E−03 | B: −.112000E−03 | C: 0.158741E−03 | D: −.155245E−04 |
| S15: | 25.607 | 1.23 | 1.741708 | 52.9268 |
| S16: | −35.495 | D3 | | |
| S17: | INFINITY | 0.50 | 1.516798 | 64.1983 |
| S18: | INFINITY | 0.50 | | |
| S19: | INFINITY | 0.50 | 1.516798 | 64.1983 |
| S20: | INFINITY | 0.60 | | |
| I: | INFINITY | | | |

Table 1 shows examples of the variable distances D1, D2, and D3 of the zoom lens of FIG. 2 at the wide angle position, the medium angle position, and the telephoto position, respectively.

TABLE 1

| Variable distance | Wide angle position | Medium angle position | Telephoto position |
|---|---|---|---|
| D1 | 11.76 | 5.22 | 0.9 |
| D2 | 5.05 | 9.32 | 16.35 |
| D3 | 2.63 | 2.18 | 1.6 |

Figure 3A:
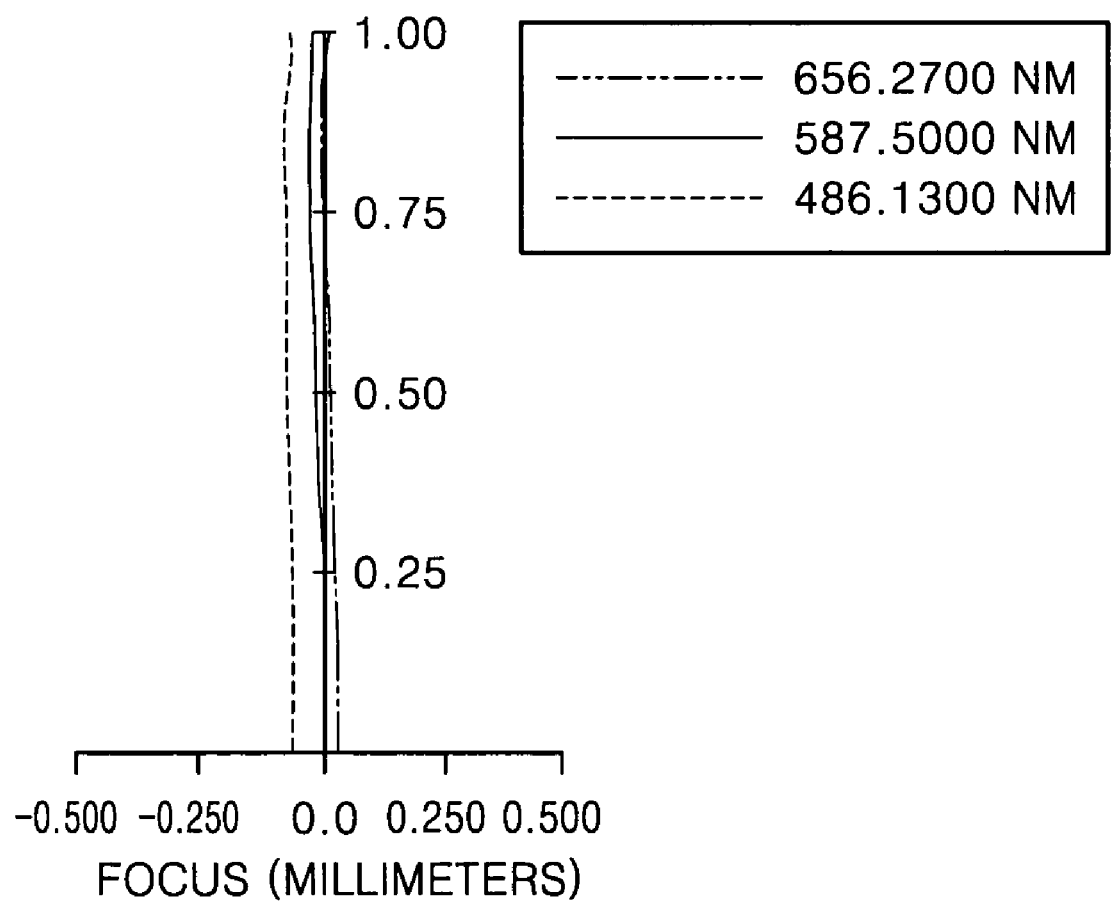
FIGS. 3A through 3C illustrate longitudinal spherical aberration, astigmatic field curvature, and distortion, respectively, of the compact zoom lens of FIG. 2 at the wide angle position.
Figure 3B:
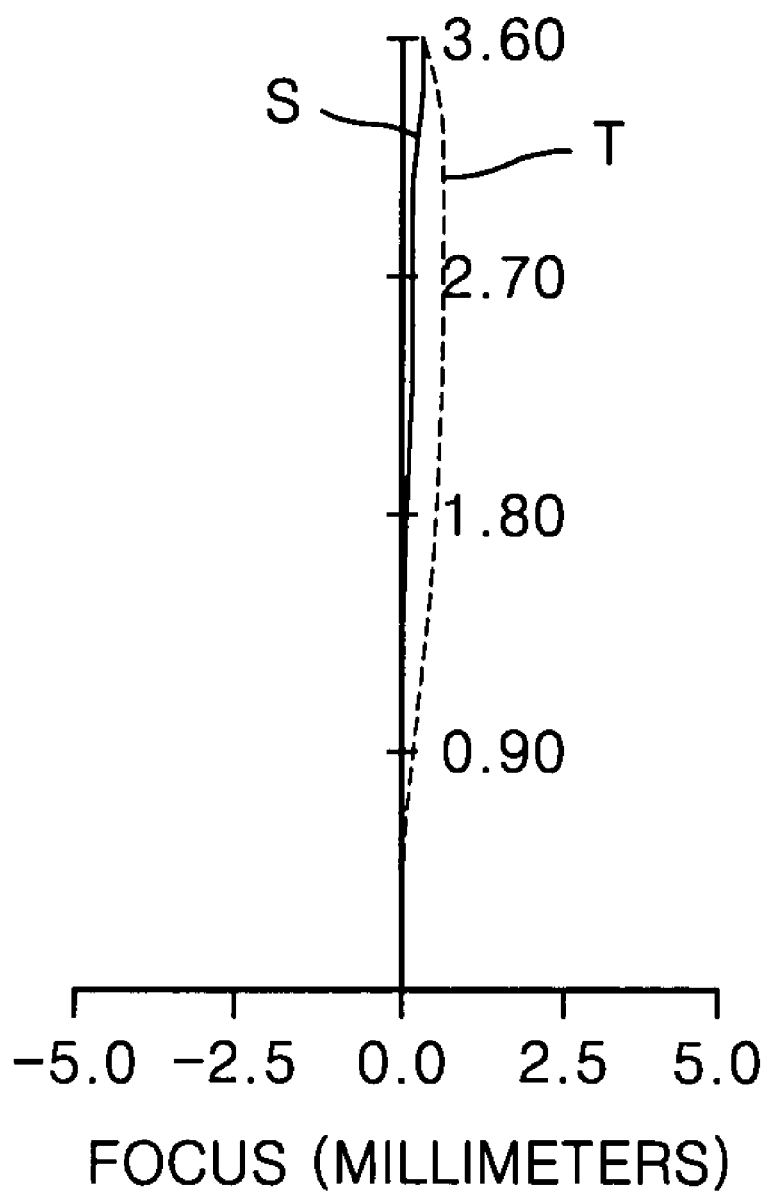
Figure 3C:
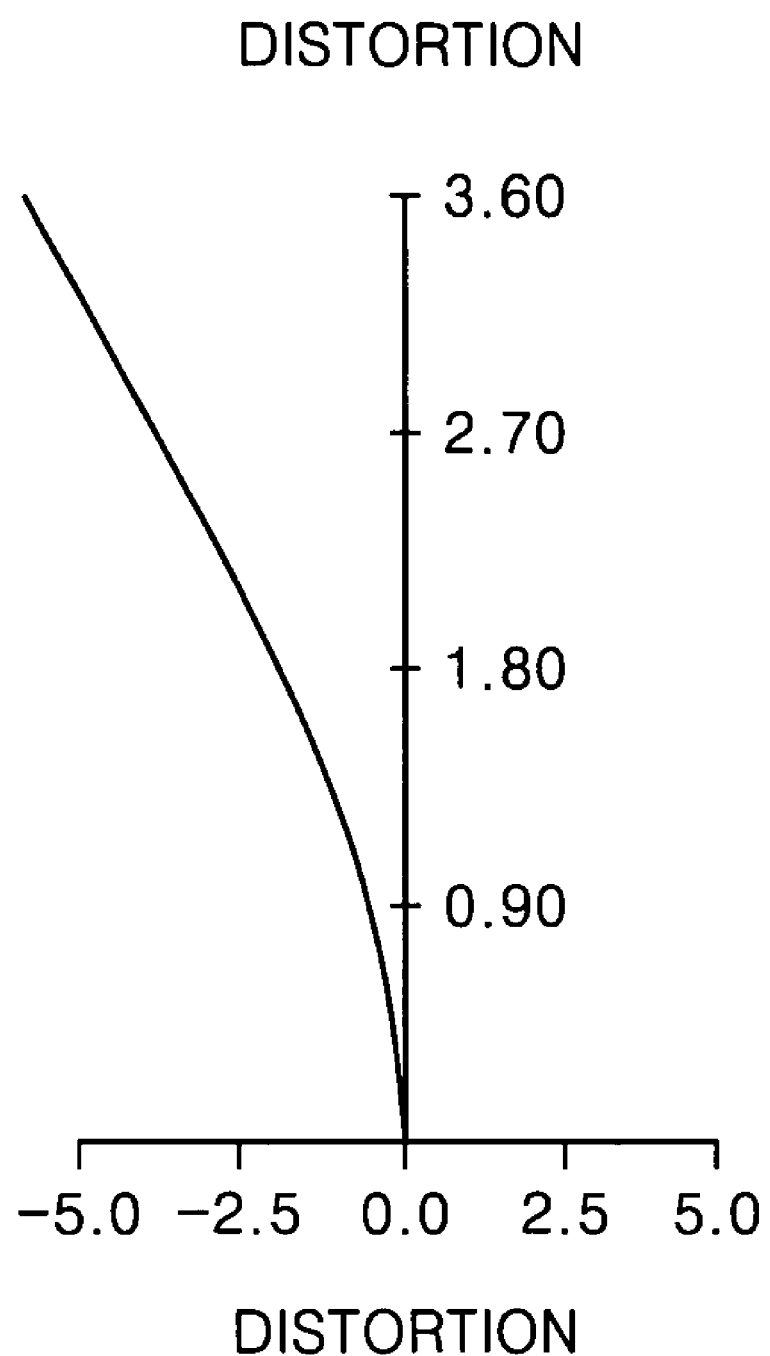
Figure 4A:
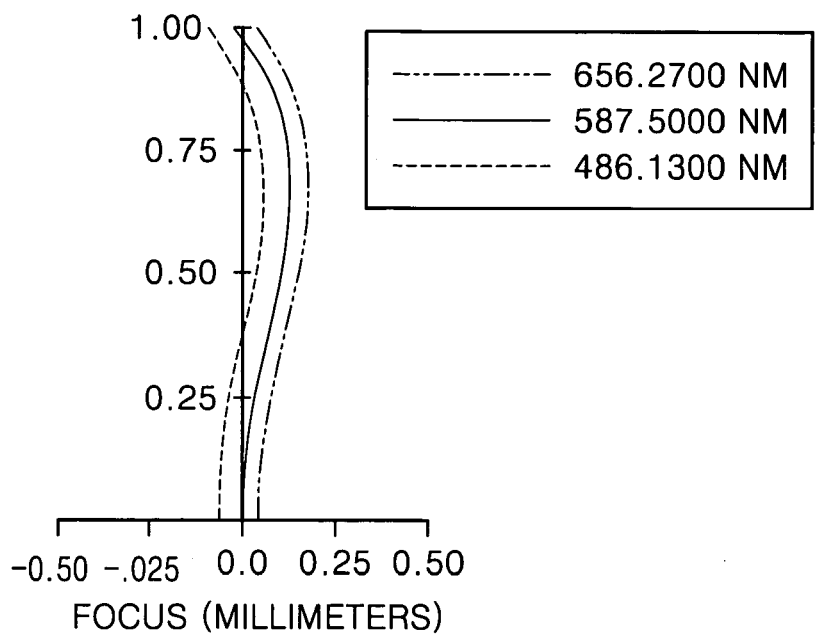
FIGS. 4A through 4C illustrate longitudinal spherical aberration, astigmatic field curvature, and distortion, respectively, of the compact zoom lens of FIG. 2 at the telephoto position.
Figure 4B:
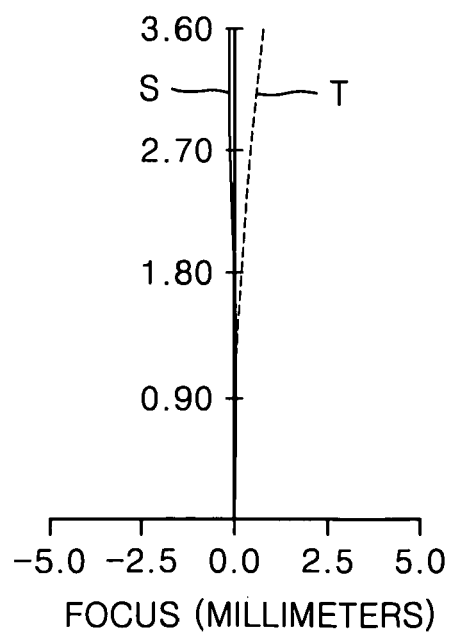
Figure 4C:
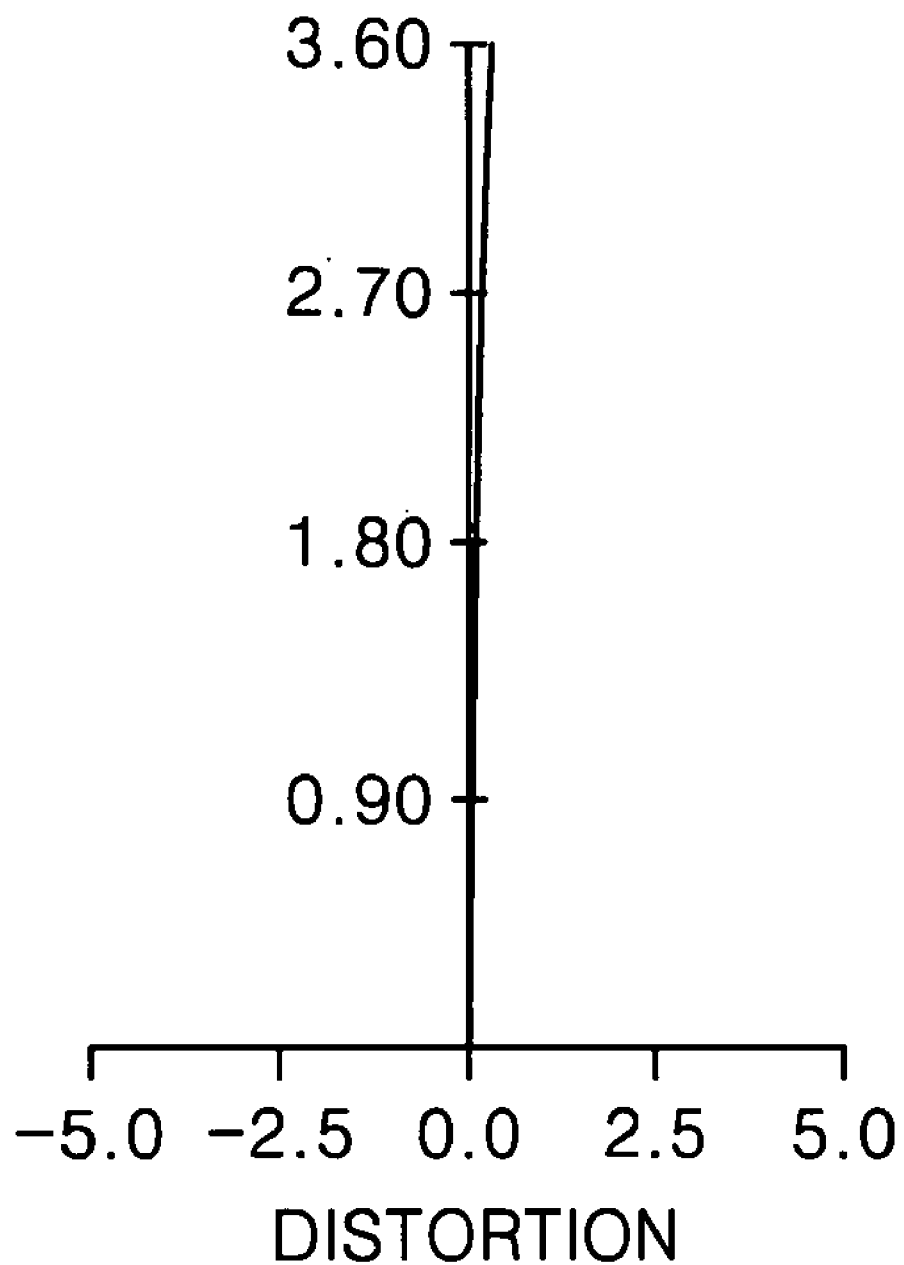

FIG. 3A illustrates longitudinal spherical aberration at the wide angle position of the zoom lens of FIG. 2 with respect to light with wavelengths of 486.1300 nm, 587.5600 nm, and 656.2700 nm. FIG. 3B illustrates astigmatic field curvature, that is, tangential field curvature T and sagittal field curvature S. FIG. 3C illustrates percent distortion. Also, FIGS. 4A through 4C illustrate longitudinal spherical aberration, astigmatic field curvature, and distortion, respectively, at the telephoto position of the zoom lens of FIG. 2.

EMBODIMENT 2

Figure 5:
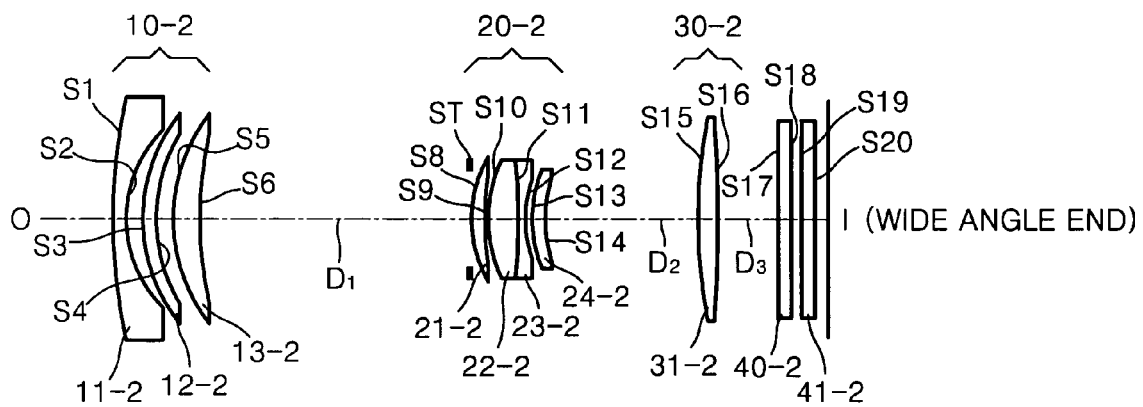
FIG. 5 is cross-sectional views illustrating optical configurations of a compact zoom lens at a wide angle position, a medium angle position, and a telephoto position, respectively, according to another embodiment of the present invention.
Figure 5:
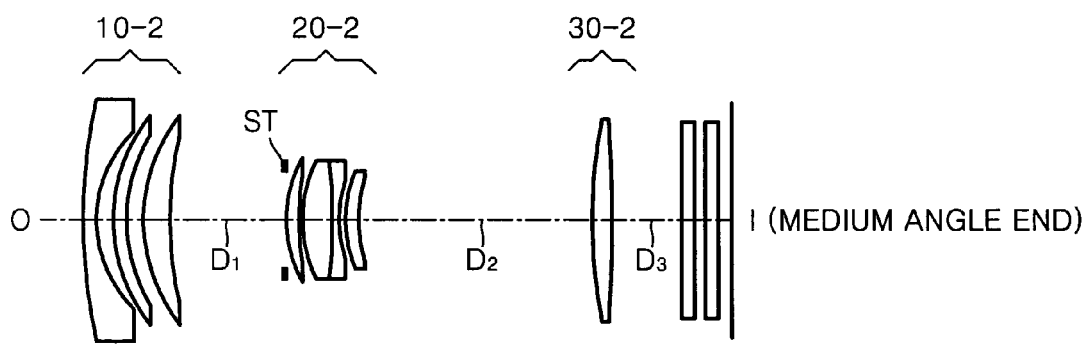
Figure 5:
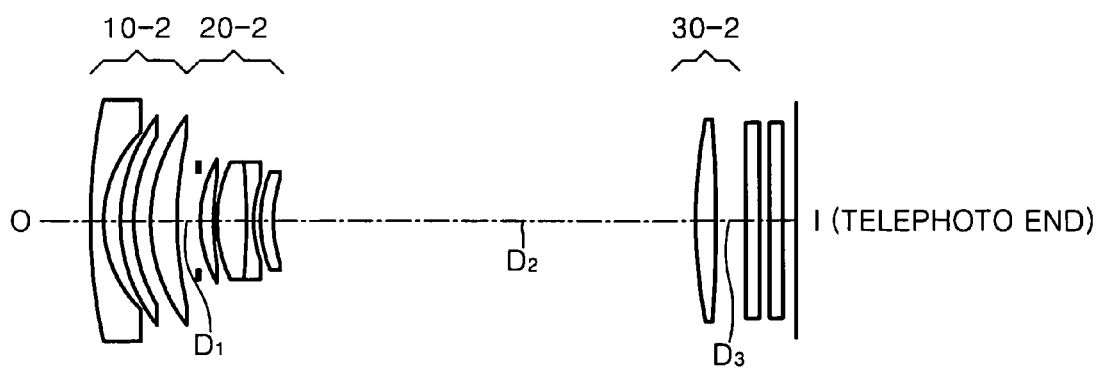

FIG. 5 is a cross-sectional view illustrating optical configurations of a zoom lens at a wide angle position, a medium angle position, and a telephoto position, respectively, according to another embodiment of the present invention. Referring to FIG. 5, a first lens group 10-2 has first through third lenses 11-2, 12-2, and 13-2. A second lens group 20-2 has fourth through seventh lenses 21-2, 22-2, 23-2, and 24-2. A third lens group 30-2 has an eighth lens 31-2. Reference numeral 40-2 designates an infrared filter, and reference numeral 41-2 designates a cover glass.

f; 6.60~10.82~19.81, Fno; 3.19~4.01~6.02, 2ω; 59.82~37.18~20.43

| Surface(S) | Radius of curvature(R) | Thickness or distance Between lenses(Dn) | Refractive index($N_d$) | Abbe number($V_d$) |
|---|---|---|---|---|
| 0: | INFINITY | INFINITY | | |
| S1: | 27.398 | 0.50 | 1.816092 | 45.2673 |
| S2: | 5.301 | 0.78 | | |
| S3: | 7.473 | 0.50 | 1.531200 | 56.5000(plastic lens) |
| S4: | 6.347 | 0.72 | | |
| | ASP: | | | |
| | K: −2.032070 | | | |
| | A: 0.408593E−03 | B: −.806044E−04 | C: −.630363E−07 | D: −.297865E−07 |

-continued

| | f; 6.60~10.82~19.81, Fno; 3.19~4.01~6.02, 2ω; 59.82~37.18~20.43 | | | |
|---|---|---|---|---|
| Surface(S) | Radius of curvature(R) | Thickness or distance Between lenses(Dn) | Refractive index($N_d$) | Abbe number($V_d$) |
| S5: | 7.535 | 1.08 | 1.846663 | 23.7848 |
| S6: | 14.908 | D1 | | |
| ST: | INFINITY | 0.00 | | |
| S8: | 5.408 | 0.56 | 1.850012 | 42.7794 |
| S9: | 14.331 | 0.10 | | |
| S10: | 5.614 | 1.26 | 1.731511 | 54.3329 |
| S11: | −19.838 | 0.30 | 1.729869 | 27.1164 |
| S12: | 4.325 | 0.37 | | |
| S13: | 11.220 | 0.50 | 1.531200 | 56.5000(plastic lens) |
| | ASP: | | | |
| | K: 0.000000 | | | |
| | A: 0.694594E−02 | B: −.177165E−03 | C: 0.795136E−03 | D: −.376833E−04 |
| S14: | 11.202 | D2 | | |
| | ASP: | | | |
| | K: 0.000000 | | | |
| | A: 0.109982E−01 | B: −.134030E−03 | C: 0.371074E−03 | D: −.603964E−04 |
| S15: | 18.745 | 0.83 | 1.761266 | 50.5174 |
| S16: | −119.514 | D3 | | |
| S17: | INFINITY | 0.50 | 1.516798 | 64.1983 |
| S18: | INFINITY | 0.50 | | |
| S19: | INFINITY | 0.50 | 1.516798 | 64.1983 |
| S20: | INFINITY | 0.58 | | |
| I: | INFINITY | | | |

Table 2 shows examples of the variable distances D1, D2, and D3 of the zoom lens of FIG. 5 at the wide angle position, the medium angle position, and the telephoto position, respectively.

TABLE 2

| Variable distance | Wide angle position | Medium angle position | Telephoto position |
|---|---|---|---|
| D1 | 11.5 | 4.84 | 0.9 |
| D2 | 6.44 | 9.88 | 19.1 |
| D3 | 2.59 | 2.97 | 1.41 |

Figure 6A:
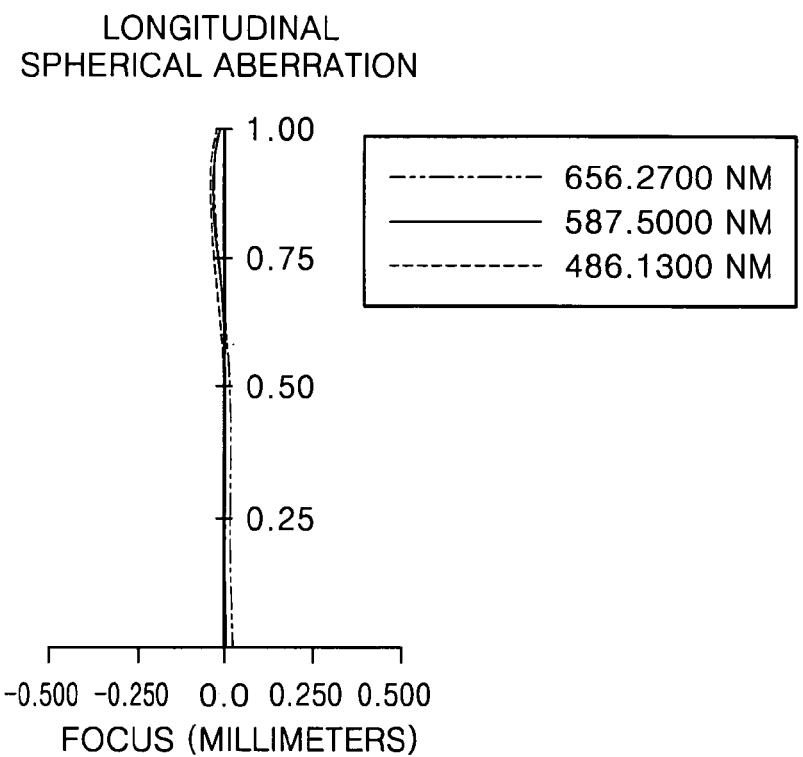
FIGS. 6A through 6C illustrate longitudinal spherical aberration, astigmatic field curvature, and distortion, respectively, of the compact zoom lens of FIG. 5 at the wide angle position.
Figure 6B:
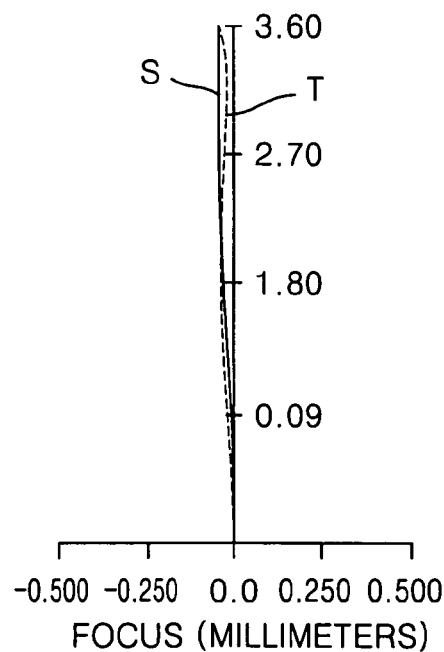
Figure 6C:
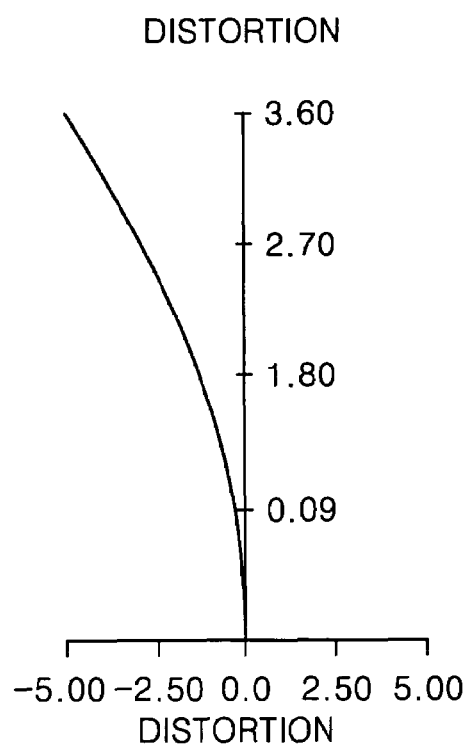

FIGS. 6A through 6C illustrate longitudinal spherical aberration, astigmatic field curvature, and distortion, respectively, at the wide angle position of the zoom lens of FIG. 5.

Figure 7A:
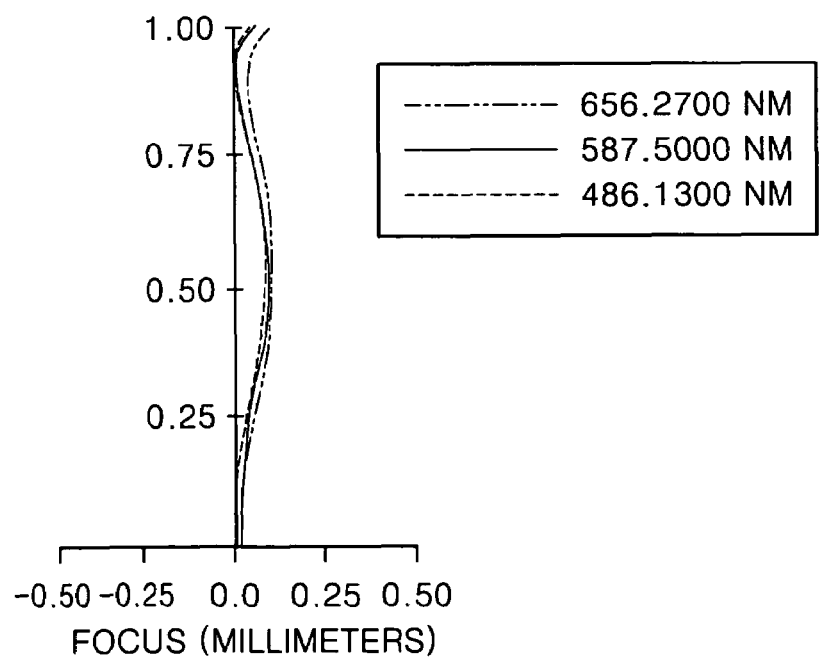
FIGS. 7A through 7C illustrate longitudinal spherical aberration, astigmatic field curvature, and distortion, respectively, of the compact zoom lens of FIG. 5 at the telephoto position.
Figure 7B:
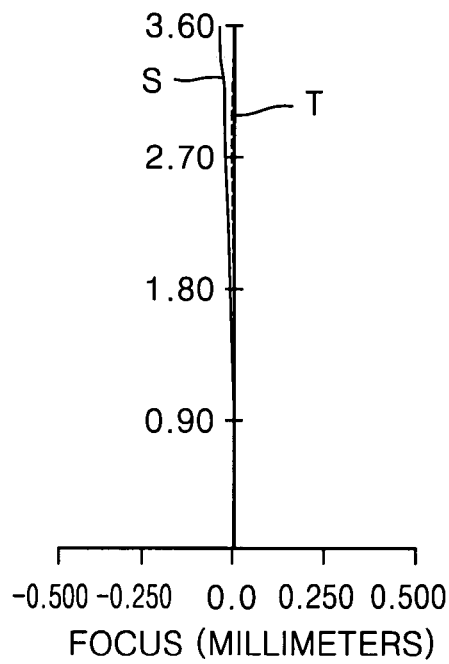
Figure 7C:
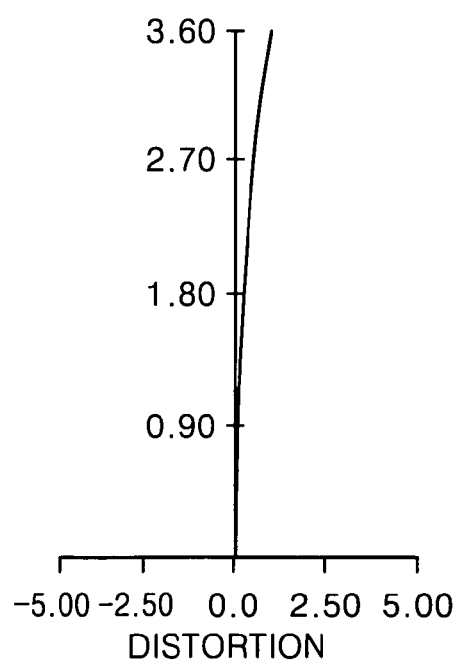

FIGS. 7A through 7C illustrate longitudinal spherical aberration, astigmatic field curvature, and distortion, respectively, at the telephoto position of the zoom lens of FIG. 5.

EMBODIMENT 3

Figure 8:
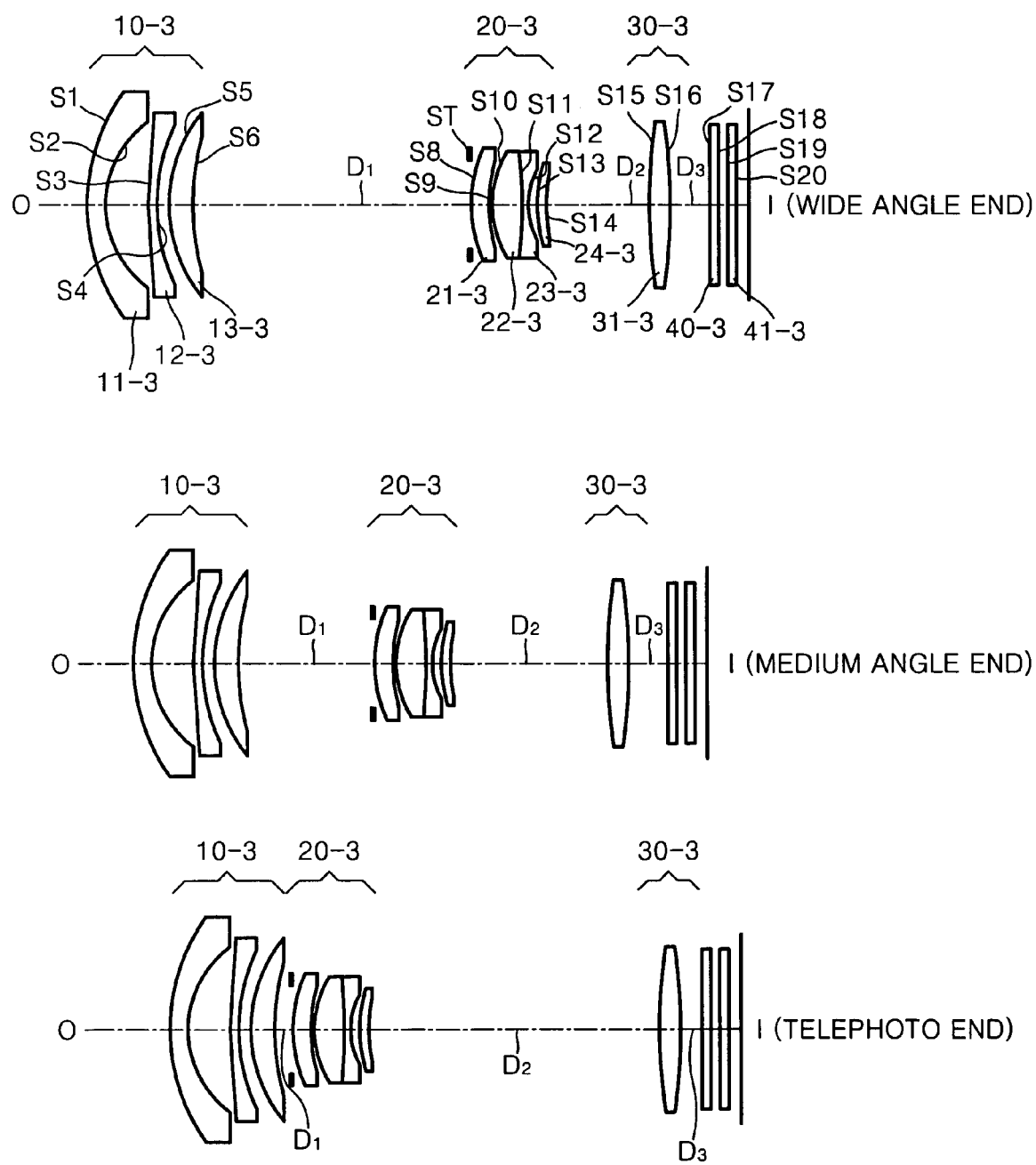
FIG. 8 is cross-sectional views illustrating optical configurations of a compact zoom lens at a wide angle position, a medium angle position, and a telephoto position, respectively, according to still another embodiment of the present invention.

FIG. 8 is a cross-sectional view illustrating optical configurations of a zoom lens at a wide angle position, a medium angle position, and a telephoto position, respectively, according to still another embodiment of the present invention. Referring to FIG. 8, a first lens group 10-3 has first through third lenses 11-3, 12-3, and 13-3. A second lens group 20-3 has fourth through seventh lenses 21-3, 22-3, 23-3, and 24-3. A third lens group 30-3 has an eighth lens 31-3. Reference numeral 40-3 designates an infrared filter, and reference numeral 41-3 designates a cover glass.

| | f; 6.50~10.66~19.50 Fno; 2.90~3.57~5.05 2ω; 59.38~37.22~20.70 | | | |
|---|---|---|---|---|
| Surface(S) | Radius of curvature(R) | Thickness or distance between lenses(Dn) | Refractive index($N_d$) | Abbe number($V_d$) |
| 0: | INFINITY | INFINITY | | |
| S1: | 10.113 | 1.00 | 1.829386 | 33.1861 |
| S2: | 5.386 | 2.16 | | |
| S3: | 48.447 | 0.50 | 1.531200 | 56.5000(plastic lens) |
| S4: | 9.775 | 0.62 | | |
| | ASP: | | | |
| | K: −3.001057 | | | |
| | A: 0.816584E−03 | B: −.116274E−04 | C: 0.477461E−06 | D: −.217586E−07 |
| S5: | 8.123 | 1.21 | 1.844706 | 23.8272 |
| S6: | 14.376 | D1 | | |
| ST: | INFINITY | 0.00 | | |
| S8: | 5.788 | 1.07 | 1.842672 | 43.2965 |
| S9: | 15.725 | 0.10 | | |
| S10: | 5.485 | 1.55 | 1.724549 | 54.8311 |
| S11: | −20.695 | 0.32 | 1.737792 | 27.5851 |
| S12: | 4.026 | 0.42 | | |

-continued

| | f; 6.50~10.66~19.50 Fno; 2.90~3.57~5.05 2ω; 59.38~37.22~20.70 | | | |
|---|---|---|---|---|
| Surface(S) | Radius of curvature(R) | Thickness or distance between lenses(Dn) | Refractive index($N_d$) | Abbe number($V_d$) |
| S13: | 10.352 | 0.50 | 1.514179 | 54.6606(plastic lens) |
| | ASP: | | | |
| | K: 0.000000 | | | |
| | A: 0.139714E−02 | B: −.297338E−03 | C: 0.197128E−03 | D: −.315170E−04 |
| S14: | 11.991 | D2 | | |
| | ASP: | | | |
| | K: 0.000000 | | | |
| | A: 0.797539E−02 | B: −.181345E−03 | C: 0.871765E−03 | D: −.393341E−04 |
| S15: | 37.605 | 0.93 | 1.562832 | 40.3785 |
| S16: | −41.739 | D3 | | |
| S17: | INFINITY | 0.50 | 1.516798 | 64.1983 |
| S18: | INFINITY | 0.50 | | |
| S19: | INFINITY | 0.50 | 1.516798 | 64.1983 |
| S20: | INFINITY | 0.56 | | |
| I: | INFINITY | | | |

Table 3 shows examples of the variable distances D1, D2, and D3 of the zoom lens of FIG. 8 at the wide angle position, the medium angle position, and the telephoto position, respectively.

TABLE 3

| Variable distance | Wide angle position | Medium angle position | Telephoto position |
|---|---|---|---|
| D1 | 16 | 7.04 | 0.9 |
| D2 | 5.39 | 8.29 | 15.15 |
| D3 | 2.18 | 2.14 | 1.2 |

Figure 9A:
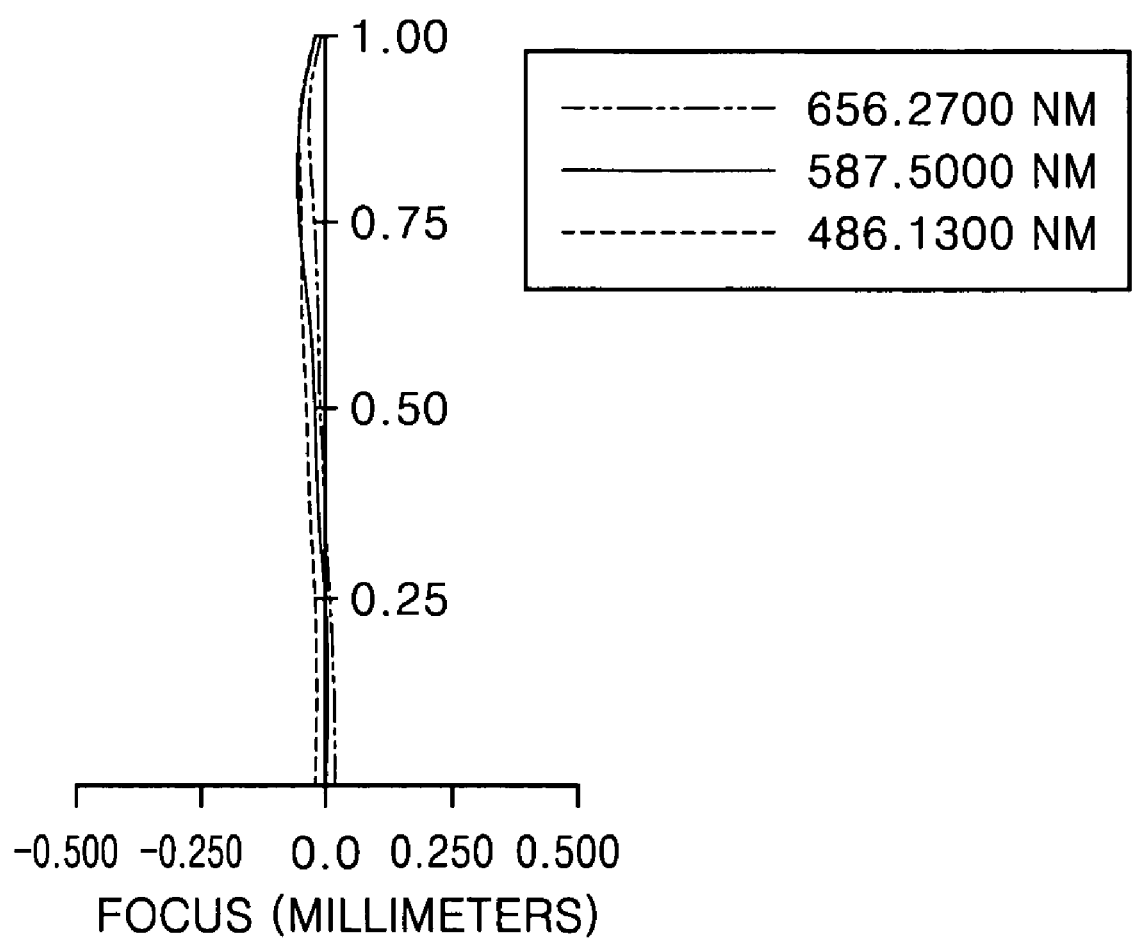
FIGS. 9A through 9C illustrate longitudinal spherical aberration, astigmatic field curvature, and distortion, respectively, of the compact zoom lens of FIG. 8 at the wide angle position.
Figure 9B:
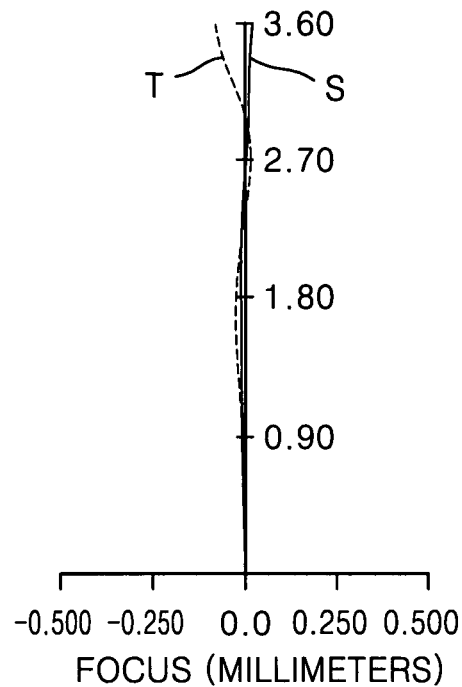
Figure 9C:
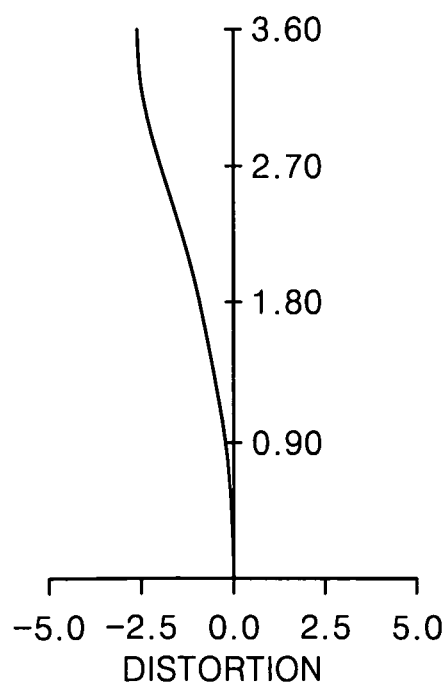

FIGS. 9A through 9C illustrate longitudinal spherical aberration, astigmatic field curvature, and distortion, respectively, at the wide angle position of the zoom lens of FIG. 8.

Figure 10A:
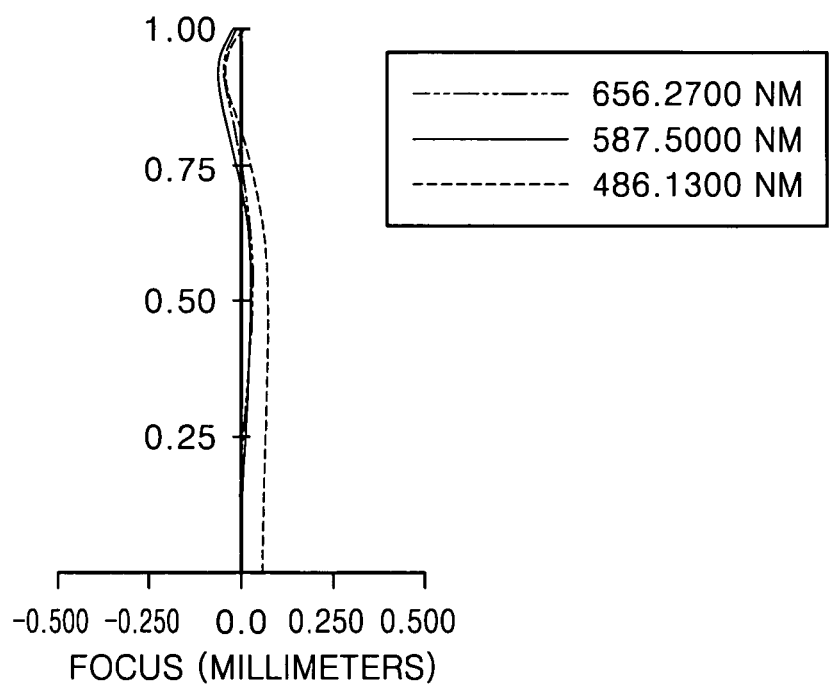
FIGS. 10A through 10C illustrate longitudinal spherical aberration, astigmatic field curvature, and distortion, respectively, of the compact zoom lens of FIG. 8 at the telephoto position.
Figure 10B:
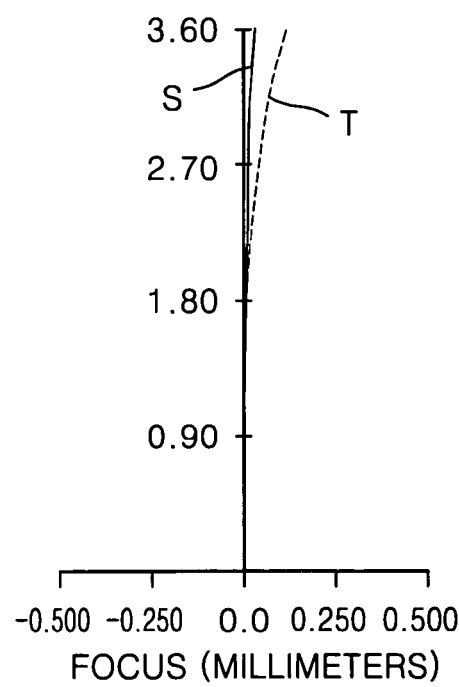
Figure 10C:
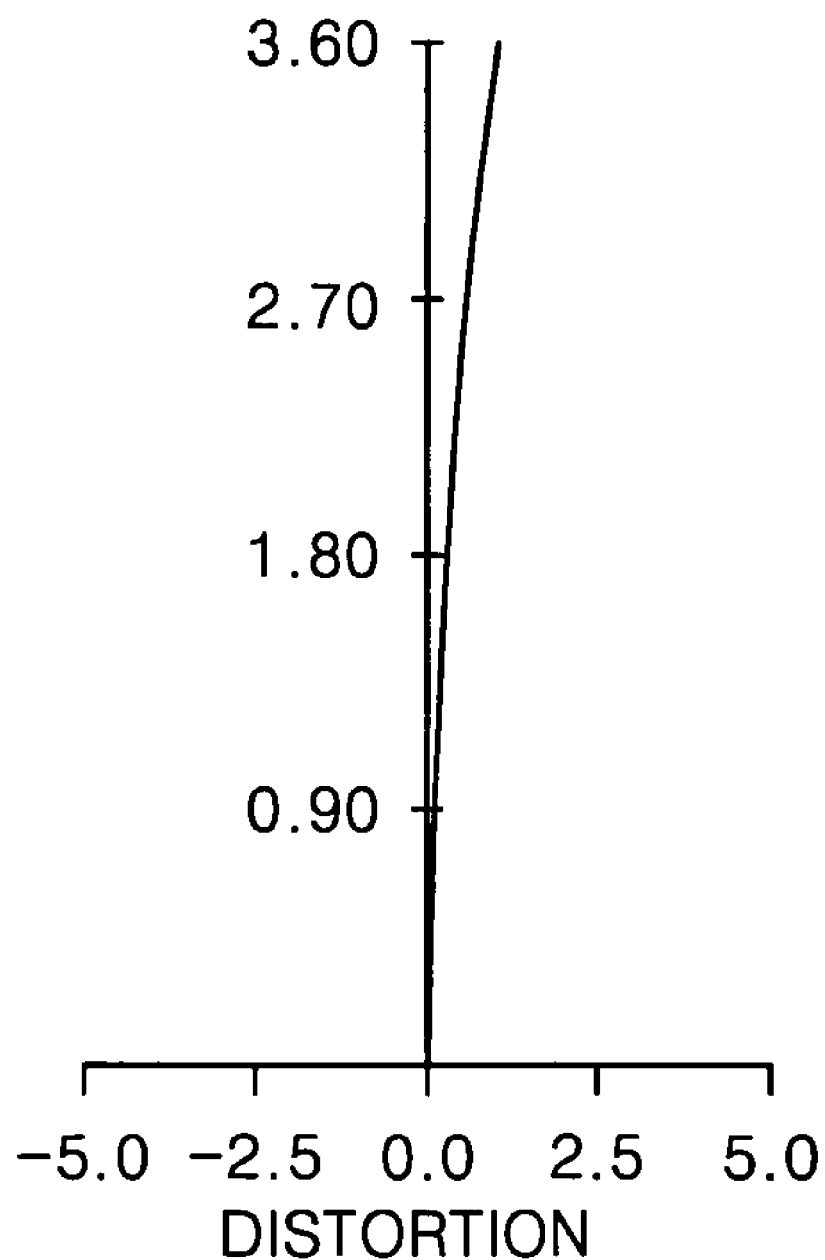

FIGS. 10A through 10C illustrate longitudinal spherical aberration, astigmatic field curvature, and distortion, respectively, at the telephoto position of the zoom lens of FIG. 8.

EMBODIMENT 4

Figure 11:
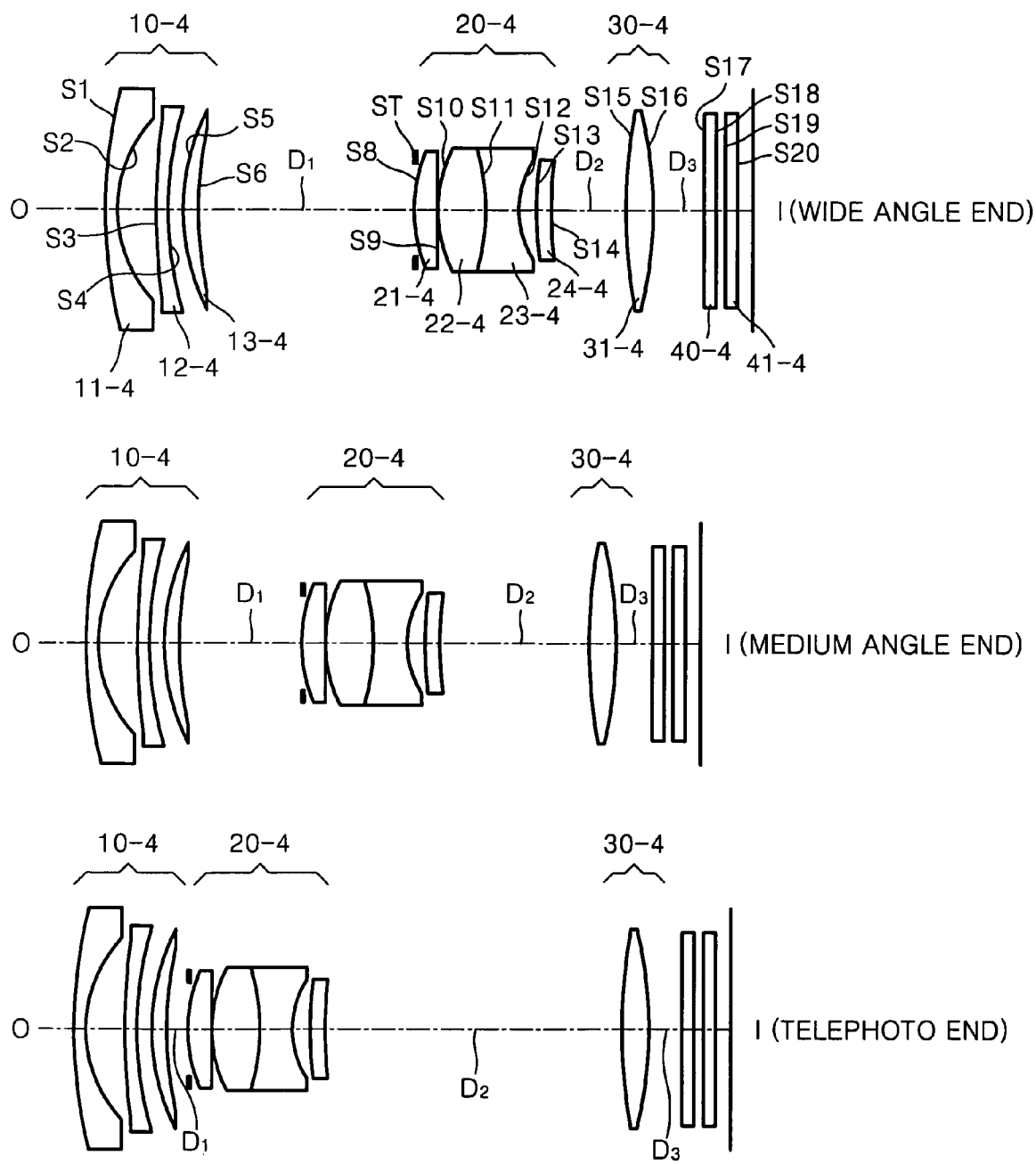
FIG. 11 is cross-sectional views illustrating optical configurations of a compact zoom lens at a wide angle position, a medium angle position, and a telephoto position, respectively, according to yet another embodiment of the present invention.

FIG. 11 is a cross-sectional view illustrating optical configurations of a zoom lens at a wide angle position, a medium angle position, and a telephoto position, respectively, according to yet another embodiment of the present invention. Referring to FIG. 11, a first lens group 10-4 has first through third lenses 11-4, 12-4, and 13-4. A second lens group 20-4 has fourth through seventh lenses 21-4, 22-4, 23-4, and 24-4. A third lens group 30-4 has an eighth lens 31-4. Reference numeral 40-4 designates an infrared filter, and reference numeral 41-4 designates a cover glass.

| | f; 5.81~9.53~17.44 Fno; 2.93~3.84~5.62 2ω; 66.27~41.42~23.30 | | | |
|---|---|---|---|---|
| Surface(S) | Radius of curvature(R) | Thickness or distance Between lenses(Dn) | Refractive index($N_d$) | Abbe number($V_d$) |
| 0: | INFINITY | INFINITY | | |
| S1: | 22.431 | 0.50 | 1.835321 | 43.8119 |
| S2: | 6.057 | 1.71 | | |
| S3: | 42.882 | 0.50 | 1.531200 | 56.5000(plastic lens) |
| S4: | 13.561 | 0.64 | | |
| | ASP: | | | |
| | K: −7.019799 | | | |
| | A: 0.219038E−03 | B: −.216549E−05 | C: 0.152669E−07 | D: −.549159E−08 |
| S5: | 8.989 | 0.71 | 1.846663 | 23.7848 |
| S6: | 18.189 | D1 | | |
| ST: | INFINITY | 0.00 | | |
| S8: | 9.802 | 0.92 | 1.813696 | 44.4262 |
| S9: | 5906.046 | 0.10 | | |
| S10: | 5.666 | 1.97 | 1.715829 | 55.1371 |
| S11: | −12.922 | 1.47 | 1.746092 | 27.1698 |
| S12: | 4.020 | 0.72 | | |
| S13: | 13.128 | 0.70 | 1.531200 | 56.5000(plastic lens) |
| | ASP: | | | |
| | K: 0.000000 | | | |
| | A: 0.538886E−03 | B: 0.421312E−05 | C: −.464631E−04 | D: 0.158079E−06 |
| S14: | 17.922 | D2 | | |
| | ASP: | | | |
| | K: 0.000000 | | | |
| | A: 0.286025E−02 | B: 0.130056E−04 | C: −.371515E−05 | D: −.354871E−05 |
| S15: | 34.046 | 1.07 | 1.744109 | 52.6117 |
| S16: | −18.028 | 2.15 | | |

-continued f: 5.81~9.53~17.44 Fno: 2.93~3.84~5.62 2ω: 66.27~41.42~23.30

| Surface(S) | Radius of curvature(R) | Thickness or distance Between lenses(Dn) | Refractive index($N_d$) | Abbe number($V_d$) |
|---|---|---|---|---|
| S17: | INFINITY | 0.50 | 1.516798 | 64.1983 |
| S18: | INFINITY | 0.50 | | |
| S19: | INFINITY | 0.50 | 1.516798 | 64.1983 |
| S20: | INFINITY | 0.59 | | |
| I: | INFINITY | | | |

Table 4 shows examples of the variable distances D1, D2, and D3 of the zoom lens of FIG. 11 at the wide angle position, the medium angle position, and the telephoto position, respectively.

TABLE 4

| Variable distance | Wide angle position | Medium angle position | Telephoto position |
|---|---|---|---|
| D1 | 11.76 | 5.74 | 0.9 |
| D2 | 3.25 | 7.29 | 14.12 |
| D3 | 2.15 | 1.49 | 1.28 |

Figure 12A:
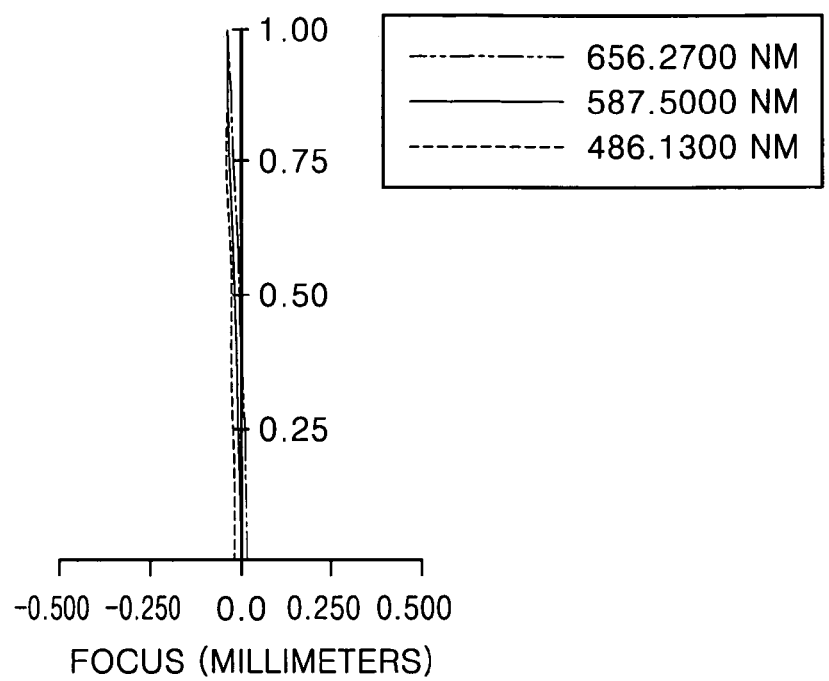
FIGS. 12A through 12C illustrate longitudinal spherical aberration, astigmatic field curvature, and distortion, respectively, of the compact zoom lens of FIG. 11 at the wide angle position.
Figure 12B:
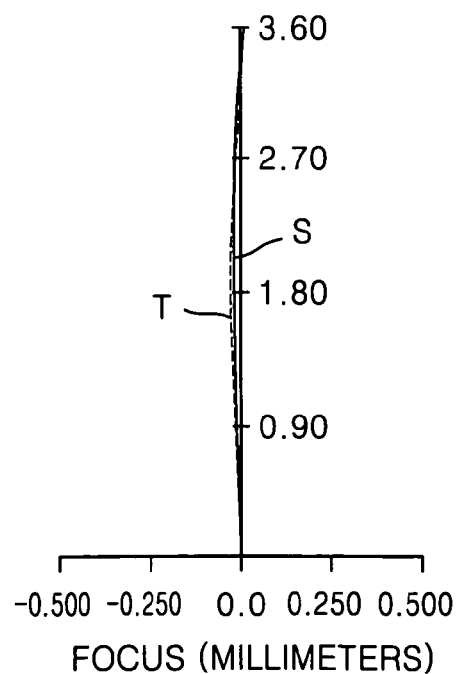
Figure 12C:
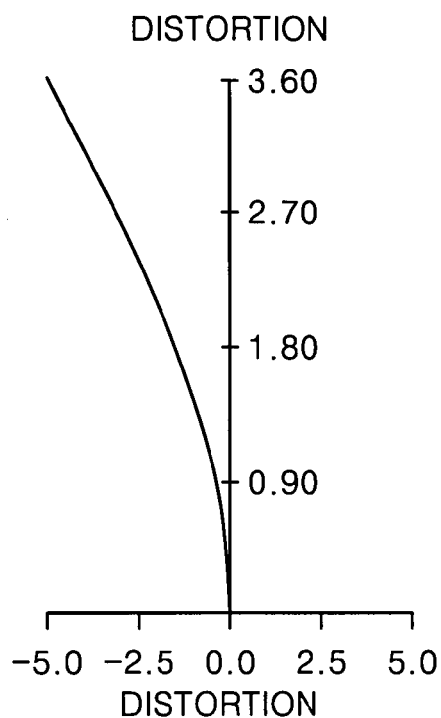
Figure 13A:
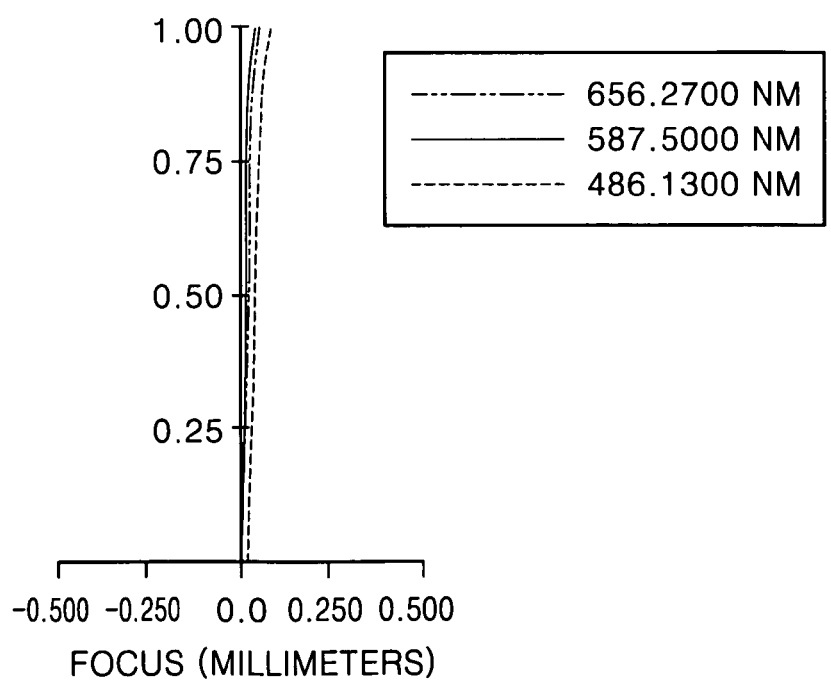
FIGS. 13A through 13C illustrate longitudinal spherical aberration, astigmatic field curvature, and distortion, respectively, of the compact zoom lens of FIG. 11 at the telephoto position.
Figure 13B:
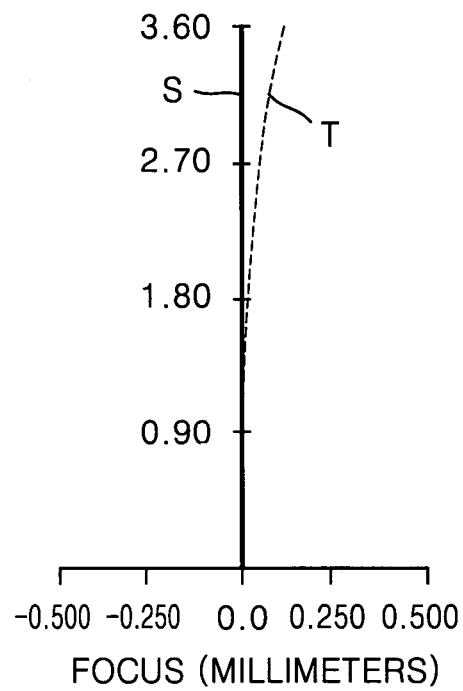
Figure 13C:
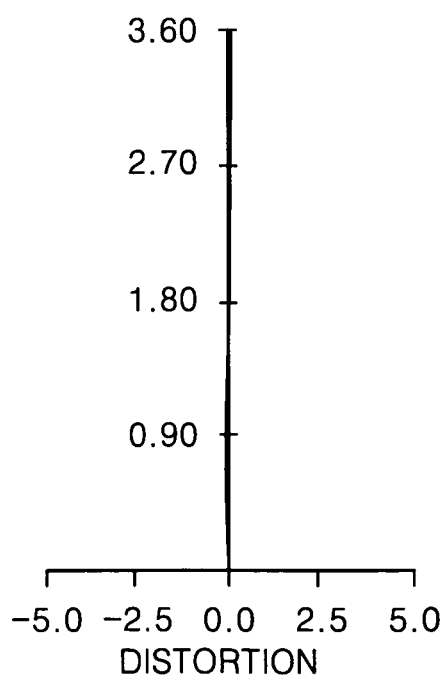

FIGS. 12A through 12C illustrate longitudinal spherical aberration, astigmatic field curvature, and distortion, respectively, at the wide angle position of the zoom lens of FIG. 11. FIGS. 13A through 13C illustrate longitudinal spherical aberration, astigmatic field curvature, and distortion, respectively, at the telephoto position of the zoom lens of FIG. 11.

Table 5 shows values of Formulae 1 through 5 in each of the embodiments illustrated in FIGS. 2, 5, 8, and 11, which are referred to as Embodiments 1, 2, 3, and 4, respectively, in the table.

TABLE 5

| | Embodiment 1 | Embodiment 2 | Embodiment 3 | Embodiment 4 |
|---|---|---|---|---|
| Formula 1 | 1.774 | 1.137 | 1.597 | 1.895 |
| Formula 2 | 2.799 | 3.002 | 3.001 | 3.002 |
| Formula 3 | 2.536 | 2.149 | 3.168 | 2.568 |

The zoom lens satisfying the aforementioned Formulae can be made compactly, provide superior optical performance, and ensure a high zoom ratio.

As described above, the compact zoom lens according to the present invention can ensure a high zoom ratio, be made compact and light, and reduce manufacturing costs by adjusting the ratio of the sum of the thicknesses of the lens groups to the overall focal length at the wide angle position and employing the plastic lens.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A zoom lens comprising:
a first lens group having a negative refractive power;
a second lens group having a positive refractive power; and
a third lens group having a positive refractive power,
wherein the first through third lens groups are arranged sequentially from an object, and when zooming is performed from a wide angle position to a telephoto position, the distance between the first lens group and the second lens group decreases and the distance between the second lens group and the third lens group increases, and the zoom lens includes at least one plastic lens and satisfies the inequality $$1 \le \frac{(G1 + G2 + G3)}{f_w} \le 1.8$$

where G1 denotes the thickness of the first lens group, G2 denotes the thickness of the second lens group, G3 denotes the thickness of the third lens group, and $f_w$ denotes the overall focal length at the wide angle position.

2. The zoom lens of claim 1, satisfying the inequality $$2.1 \le \frac{G1 + (D1_w - D1_t)}{f_w} \le 3.2$$

where G1 denotes the thickness of the first lens group, $D1_w$ denotes the distance between the first lens group and the second lens group at the wide angle position, $D1_t$ denotes the distance between the first lens group and the second lens group at the telephoto position, and $f_w$ denotes the overall focal length at the wide angle position.

3. The zoom lens of claim 1, wherein the first lens group has at least one plastic lens.

4. The zoom lens of claim 3, wherein a second object-side lens of the first lens group is a plastic aspheric lens.

5. The zoom lens of claim 1, wherein the first lens group has a plastic aspheric lens with a negative refractive power, and the second lens group has a plastic aspheric lens with a positive refractive power.

6. The zoom lens of claim 1, wherein the second lens group has a doublet.

7. The zoom lens of claim 6, wherein the doublet comprises of a lens with a relatively low dispersion value and a lens with a relatively high dispersion value.

8. The zoom lens of claim 1, wherein a last object-side lens of the second lens group is a plastic aspheric lens.

9. The zoom lens of claim 1, wherein zooming is performed by moving the first through third lens groups.

10. The zoom lens of claim 1, wherein the third lens group has a lens with a positive refractive power, a high refractive index, and a high Abbe number.

11. The zoom lens of claim 1, wherein the first lens group consists of a plurality of meniscus lenses.

12. The zoom lens of claim 1, wherein the first lens group comprises two negative meniscus lenses that are convex toward the object, and a positive meniscus lens, which are arranged sequentially from the object.

13. A zoom lens comprising:
a first lens group having a negative refractive power;
a second lens group having a positive refractive power; and
a third lens group having a positive refractive power,
wherein the first through third lens groups are arranged sequentially from an object, and when zooming is performed from a wide angle position to a telephoto position, the distance between the first lens group and the second lens group decreases and the distance between the second lens group and the third lens group increases, and the zoom lens includes at least one plastic lens and satisfies the inequality $$1 \le \frac{(G1 + G2 + G3)}{f_w} \le 1.9$$

$$2.5 \le \frac{f_t}{f_w} \le 3.2$$

where G1 denotes the thickness of the first lens group, G2 denotes the thickness of the second lens group, G3 denotes the thickness of the third lens group, $f_w$ denotes the overall focal length at the wide angle position, and $f_t$ denotes the overall focal length at the telephoto position.

14. The zoom lens of claim 13, satisfying the inequality $$2.1 \le \frac{G1 + (D1_w - D1_t)}{f_w} \le 3.2$$

where G1 denotes the thickness of the first lens group, $D1_w$ denotes the distance between the first lens group and the second lens group at the wide angle position, $D1_t$ denotes the distance between the first lens group and the second lens group at the telephoto position, and $f_w$ denotes the overall focal length at the wide angle position.

15. The zoom lens of claim 13, wherein the first lens group has at least one plastic lens.

16. The zoom lens of claim 15, wherein a second object-side lens of the first lens group is a plastic aspheric lens.

17. The zoom lens of claim 15, wherein the first lens group has a plastic aspheric lens with a negative refractive power, and the second lens group has a plastic aspheric lens with a positive refractive power.

18. The zoom lens of claim 15, wherein the second lens group has a doublet.

19. The zoom lens of claim 18, wherein the last object-side lens of the second lens group is a plastic aspheric lens.

20. The zoom lens of claim 18, wherein zooming is performed by moving the first through third lens groups.

* * * * *